(12) United States Patent  
Tanji

(10) Patent No.: US 9,230,319 B2  
(45) Date of Patent: Jan. 5, 2016

(54) METHOD OF RECONSTRUCTING A BIOLOGICAL TISSUE IMAGE, AND METHOD AND APPARATUS FOR ACQUIRING A BIOLOGICAL TISSUE IMAGE

(71) Applicant: CANON KABUSHIKI KAISHA, Tokyo (JP)

(72) Inventor: Koichi Tanji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 13/747,583

(22) Filed: Jan. 23, 2013

(65) Prior Publication Data

US 2013/0195328 A1    Aug. 1, 2013

(30) Foreign Application Priority Data

Jan. 30, 2012    (JP) ................................ 2012-016428  
Jan. 9, 2013    (JP) ................................ 2013-001864

(51) Int. Cl.
| | |
|---|---|
| *G06K 9/00* | (2006.01) |
| *G06T 7/00* | (2006.01) |
| *G06T 5/50* | (2006.01) |

(52) U.S. Cl.  
CPC ................ *G06T 7/0012* (2013.01); *G06T 5/50* (2013.01); *G06T 2207/10056* (2013.01); *G06T 2207/20048* (2013.01); *G06T 2207/20081* (2013.01); *G06T 2207/30024* (2013.01)

(58) Field of Classification Search  
USPC ................. 382/100, 128, 129, 130, 131, 132; 128/922; 250/316.1, 365; 378/4–27  
See application file for complete search history.

(56) References Cited

U.S. PATENT DOCUMENTS

| | | | | |
|---|---|---|---|---|
| 7,136,518 | B2 * | 11/2006 | Griffin et al. | 382/133 |
| 7,228,239 | B1 * | 6/2007 | Cetto | 702/30 |
| 7,515,952 | B2 * | 4/2009 | Balas et al. | 600/476 |
| 7,655,476 | B2 * | 2/2010 | Bui | 436/173 |
| 7,831,061 | B1 * | 11/2010 | Lubard et al. | 382/100 |
| 7,899,625 | B2 * | 3/2011 | Bhanot et al. | 702/19 |
| 7,962,199 | B2 * | 6/2011 | Carron et al. | 600/473 |
| 8,254,651 | B2 * | 8/2012 | Hunt et al. | 382/128 |
| 8,260,015 | B2 * | 9/2012 | Henle et al. | 382/128 |
| 8,605,968 | B2 * | 12/2013 | Alexandrov | 382/128 |
| 2007/0178067 | A1 * | 8/2007 | Maier et al. | 424/93.2 |
| 2009/0066947 | A1 * | 3/2009 | Bangalore et al. | 356/317 |
| 2011/0216952 | A1 * | 9/2011 | Kajihara | 382/128 |
| 2011/0280455 | A1 * | 11/2011 | Alexandrov | 382/128 |
| 2012/0143082 | A1 * | 6/2012 | Notingher et al. | 600/562 |
| 2013/0195327 | A1 | 8/2013 | Tanji | |

FOREIGN PATENT DOCUMENTS

| | | |
|---|---|---|
| JP | 2010-071953 | 4/2010 |
| JP | 2010-085219 | 4/2010 |

* cited by examiner

*Primary Examiner* — Anand Bhatnagar  
(74) *Attorney, Agent, or Firm* — Fitzpatrick, Cella, Harper & Scinto

(57) ABSTRACT

Provided are a method of reconstructing a biological tissue image, and a method and apparatus for acquiring a biological tissue image, which allow a biological tissue to be identified with higher accuracy than ever before. The reconstruction of the biological tissue image is performed by measuring spectra having a two-dimensional distribution correlated with a biological tissue section, and acquiring a biological tissue image from the two-dimensional measured spectra through utilization of the measured spectra and an classifier.

8 Claims, 15 Drawing Sheets

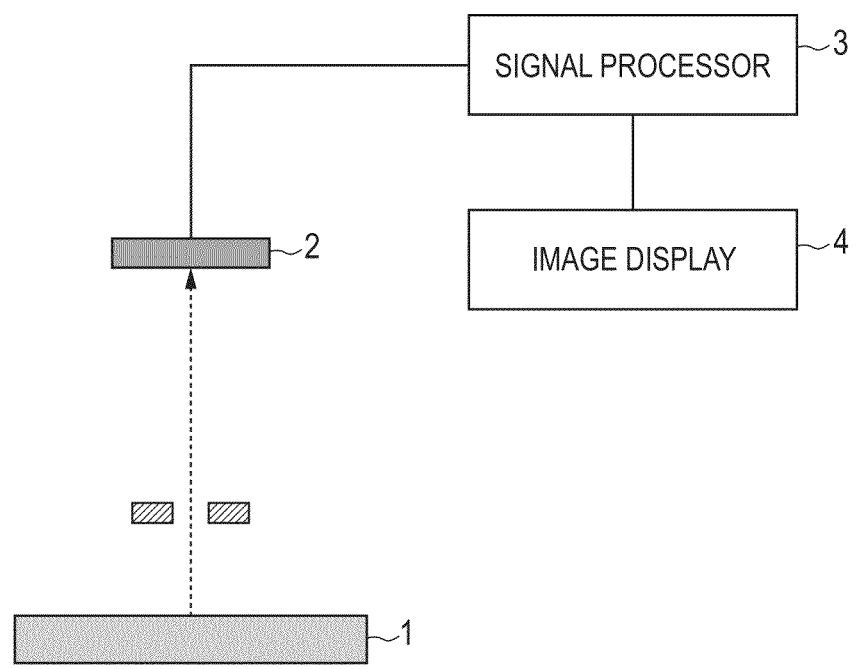

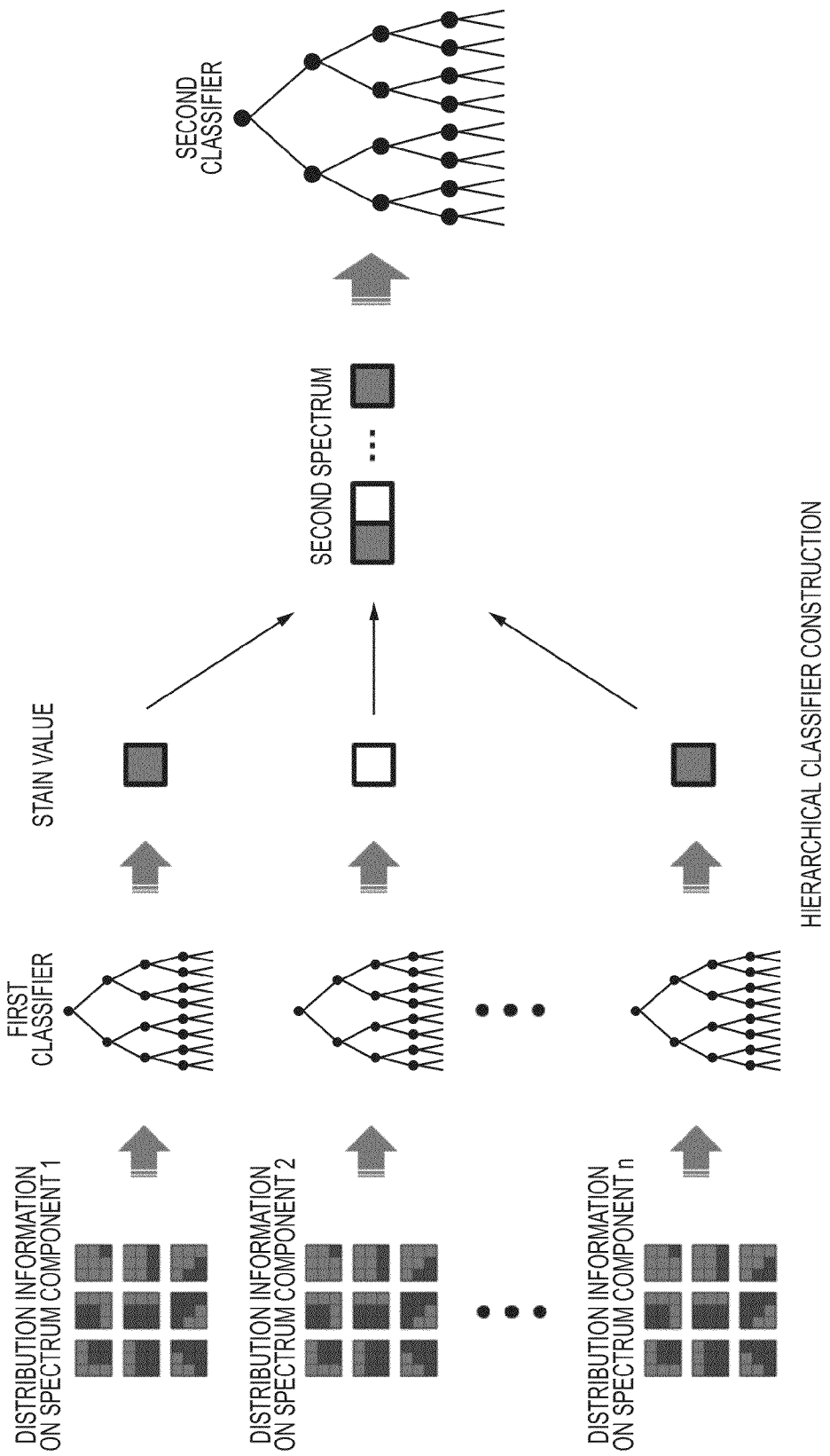

FIG. 14
FIG. 15A        FIG. 15B
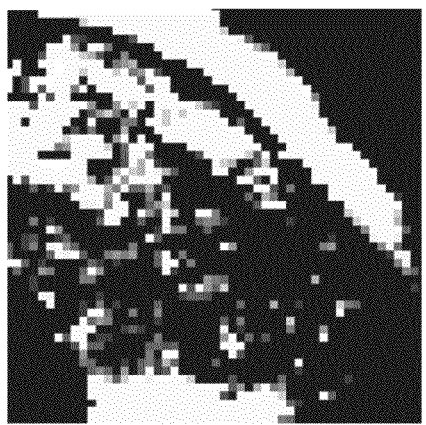   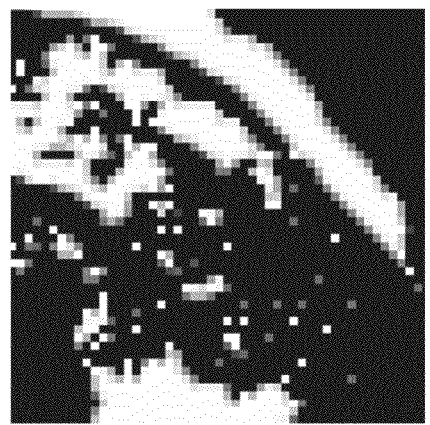

FIG. 16
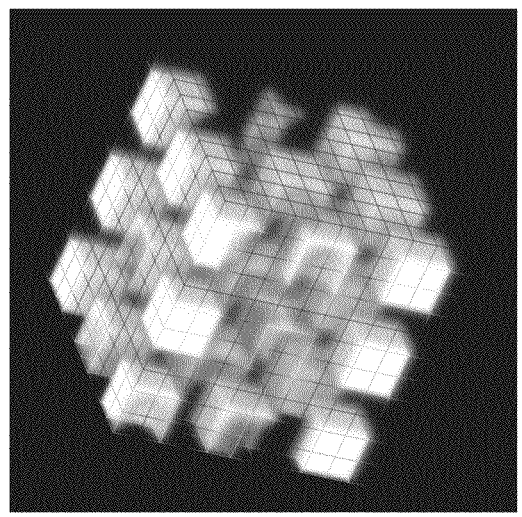
FIG. 17A   FIG. 17B   FIG. 17C
  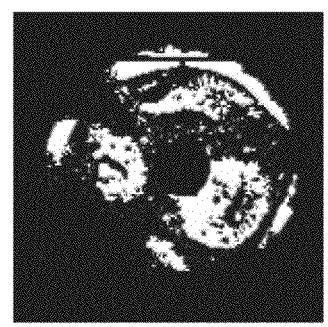

FIG. 18
FIG. 19A         FIG. 19B
 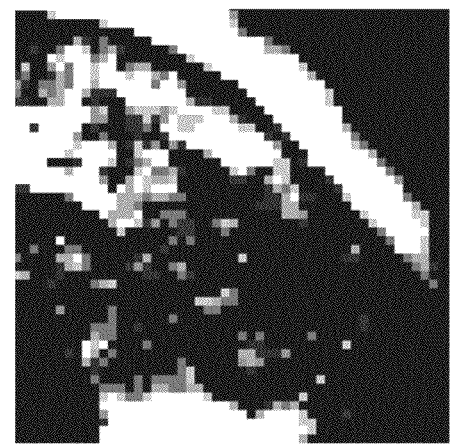

METHOD OF RECONSTRUCTING A BIOLOGICAL TISSUE IMAGE, AND METHOD AND APPARATUS FOR ACQUIRING A BIOLOGICAL TISSUE IMAGE

BACKGROUND OF THE INVENTION

1. Field of the Invention

The present invention relates to a method of reconstructing a biological tissue image, and a method and apparatus for acquiring a biological tissue image, and more particularly, to a method and apparatus for acquiring a biological tissue image reconstructed from measured spectrum data of a biological tissue. The present invention also relates to an image display for clearly displaying a diseased site in pathological diagnosis through use of the thus acquired biological tissue image.

2. Description of the Related Art

Hitherto, there has been performed pathological diagnosis, that is, observing a biological tissue with a microscope or the like and diagnosing the presence or absence of a lesion and a type of the lesion based on the observation. The pathological diagnosis requires visualization of a constituent substance or contained substance correlated with a biological tissue to be observed. Heretofore, a technique for staining a specific antigen protein through use of an immunostaining method has mainly been employed in the pathological diagnosis. When breast cancer is taken as an example, an estrogen receptor (ER) (expressed in a hormone-dependent tumor, which serves as a judgment criterion for a hormone therapy), and HER2 (membrane protein found in a fast-growing malignant cancer, which serves as a judgment criterion for Herceptin administration), are visualized by the immunostaining method. However, the immunostaining method involves the following problems. Its reproducibility is poor because an antibody is unstable and antigen-antibody reaction efficiency is difficult to control. Further, in the future, for example, when there arises a need for detection of several tens or more kinds of constituent substances or contained substances, there is a problem in that the currently-employed immunostaining method cannot meet the need any more.

Further, in some cases, the visualization of the constituent substance or contained substance is required at a cellular level, not at a tissue level. For example, it was revealed that a tumor was formed in only part of fractions of a tumor tissue after xenotransplantation to immunocompromised mice. Therefore, it is understood that growth of a tumor tissue, in which cancer stem cells are recognized, depends on differentiation and self-renewal abilities of the cancer stem cells. In such research, it is necessary to observe an expression distribution of a constituent substance or contained substance in an individual cell in a tissue, not the entire tissue.

As described above, in the pathological diagnosis, a constituent substance or contained substance correlated with a tumor tissue or the like is required to be exhaustively visualized at a cellular level. There are given, as candidates of a method for the visualization, secondary ion mass spectrometry (SIMS) such as time-of-flight secondary ion mass spectrometry (TOF-SIMS) and Raman spectroscopy. In measurement by the SIMS or Raman spectroscopy, information at each point (region) in a space can be obtained with a high spatial resolution. That is, spatial distribution information on each peak value for a measured spectrum correlated with an object to be measured is obtained. Consequently, a spatial distribution of a substance in a biological tissue correlated with the measured spectrum can be determined.

The SIMS is a method involving irradiating a sample with a primary ion beam, and detecting a secondary ion emitted from the sample, thereby obtaining a mass spectrum at each point on the sample. For example, in the TOF-SIMS, through utilization of the fact that a time-of-flight of a secondary ion depends on a mass m and charge z of the ion, the secondary ion is identified, and hence a mass spectrum at each point on a sample can be obtained.

The Raman spectroscopy involves acquiring a Raman spectrum by irradiating a substance with a laser beam, which is monochromatic light, as a light source, and detecting the generated Raman scattered light with a spectrometer or an interferometer. A difference between a frequency of the Raman scattered light and a frequency of incident light (Raman shift) has a value peculiar to a structure of a substance. Hence, a Raman spectrum specific for an object to be measured can be acquired.

As used herein, the "cellular level" means a level at which at least an individual cell can be identified. A diameter of the cell falls within a range of approximately 10 μm to 20 μm (provided that a large cell such as a nerve cell has a diameter of about 50 μm). Thus, in order to acquire a two-dimensional distribution image at a cellular level, the spatial resolution needs to be 10 μm or less, and is preferably 5 μm or less, more preferably 2 μm or less, still more preferably 1 μm or less. The spatial resolution may be determined from, for example, results of linear analysis of a knife-edge sample. That is, the spatial resolution is determined based on the following general definition: "a distance between two points at which signal intensities attributed to a substance of interest near the boundary of a sample are 20% and 80%, respectively."

Hitherto, in order to acquire biological information from the measured spectrum data, an classifier generated by machine learning in advance has been applied to the measured spectrum data of a sample (Japanese Patent Application Laid-Open No. 2010-71953). Meanwhile, a biological tissue image is essential for the pathological diagnosis, and hence an attempt has been made to display an image obtained by superimposing a measured spectrum image (spectrum information) and an optical image (morphological information) (Japanese Patent Application Laid-Open No. 2010-85219). As used herein, the machine learning refers to a technique involving empirically learning previously acquired data, and interpreting newly acquired data based on the learning results. Further, the classifier refers to judgment criterion information to be generated by empirically learning a relationship between previously acquired data and biological information.

Hitherto, one (for one point on a space or the entire sample) measured spectrum data has been used for diagnosis through application of the classifier generated by the machine learning, as described in Japanese Patent Application Laid-Open No. 2010-71953 as well. Thus, acquisition of a biological tissue image from a spatial distribution of a measured spectrum has not been envisaged. Further, although there is an example of superimposing a measured spectrum image (spectrum information) and an optical image (morphological information), there is no example of acquiring a biological tissue image involving applying machine learning (classifier) to both of the spectrum information and the morphological information. That is, there is no disclosure of a method of acquiring a biological tissue image with high accuracy involving displaying diagnosis results of, for example, the presence or absence of cancer from measurement results of spectra having a spatial distribution in a biological tissue of interest.

There is a correlation between cell morphology and pathology (e.g., a cancer cell and a normal tissue). Hence, when morphological information can also be incorporated into analysis of a measured spectrum, derivation of highly accurate results is expected to become possible.

SUMMARY OF THE INVENTION

In view of the foregoing, an object of the present invention is to acquire a biological tissue image by applying an classification algorithm to a measured spectrum acquired at each point (region) in a space. Further, when attention is paid to each peak component of the measured spectrum, the fact that spectrum information reflects a morphological distribution of a tissue of interest is utilized, and the classification algorithm is applied. That is, the present invention is characterized by applying an classification algorithm to an information distribution having spatial position information on an object whose spectrum is acquired in spatial axes and respective peak components in spectrum axis directions. The technique of the present invention can be utilized in pathological diagnosis or the like.

According to the present invention, there is provided a method of reconstructing a biological tissue image through use of multiple measured spectra obtained by measuring respective regions of a biological tissue, the method including acquiring a biological tissue image through utilization of an intensity distribution of at least one peak in each of the measured spectra and an classifier.

According to the present invention, there is also provided an apparatus wherein a biological tissue image is reconstructed through use of multiple measure spectra obtained by measuring respective regions of a biological tissue, further wherein the biological tissue image is acquired through utilization of an intensity distribution of at least one peak in each of the measure spectra and an classifier.

According to the present invention, it is possible to acquire a biological tissue image through use of both of measured spectrum information obtained by measuring the spatial distribution of a measured spectrum and morphological information obtained from distribution information on peak components. That allows a biological tissue to be identified with higher accuracy than ever before. Hence, the present invention is useful for an application to pathological diagnosis or the like.

Further features of the present invention will become apparent from the following description of exemplary embodiments with reference to the attached drawings.

BRIEF DESCRIPTION OF THE DRAWINGS

FIG. 1 is a schematic diagram of an apparatus according to the present invention.

FIG. 11 is a schematic diagram illustrating a hierarchical classifier construction process.

FIG. 14 is an image showing an application result of Example 1 of the present invention.

FIGS. 15A and 15B are images showing application effects of Example 1 of the present invention.

FIG. 16 is a diagram illustrating training data generated from three-dimensional information.

FIGS. 17A, 17B, and 17C are images showing application results of Example 2 of the present invention.

FIG. 18 is an image showing an application result of Example 2 of the present invention.

FIGS. 19A and 19B are images showing application effects of Example 2 of the present invention.

DESCRIPTION OF THE EMBODIMENTS

Hereinafter, embodiments of the present invention are specifically described with reference to the flowcharts and other drawings. It should be noted that the following specific example is an example of the best embodiment according to the present invention, but the present invention is by no means limited to any such specific embodiment.

In the present invention, there is provided a method of reconstructing a biological tissue image through use of multiple measured spectra obtained by measuring respective regions of a biological tissue, the method comprising acquiring a biological tissue image through utilization of an intensity distribution of at least one peak in each of the measured spectra and an classifier.

Measured spectra includes such as ultraviolet light spectra, infrared light spectra, visible light spectra, Raman spectra and mass spectra. The acquiring of the biological tissue image through the utilization of the intensity distribution of the at least one peak and the classifier can include acquiring a biological tissue image through utilization of an classifier hierarchically for distribution information on each peak. Further, in the above method of the present invention, the classifier can be generated through utilization of training data.

Further, in the present invention, there is provided an apparatus for acquiring a biological tissue image, the apparatus being configured to reconstruct a biological tissue image through use of the above method.

Further, in the present invention, an image display for clearly displaying a diseased site in pathological diagnosis through utilization of the apparatus for acquiring a biological tissue image through use of the above method is provided.

The present invention, which includes measuring a sample having a composition distribution in a space, is applicable to results obtained by any measurement method as long as positional information at each point in the space and measured spectrum information corresponding to the position of each point are obtained.

Figure 4:
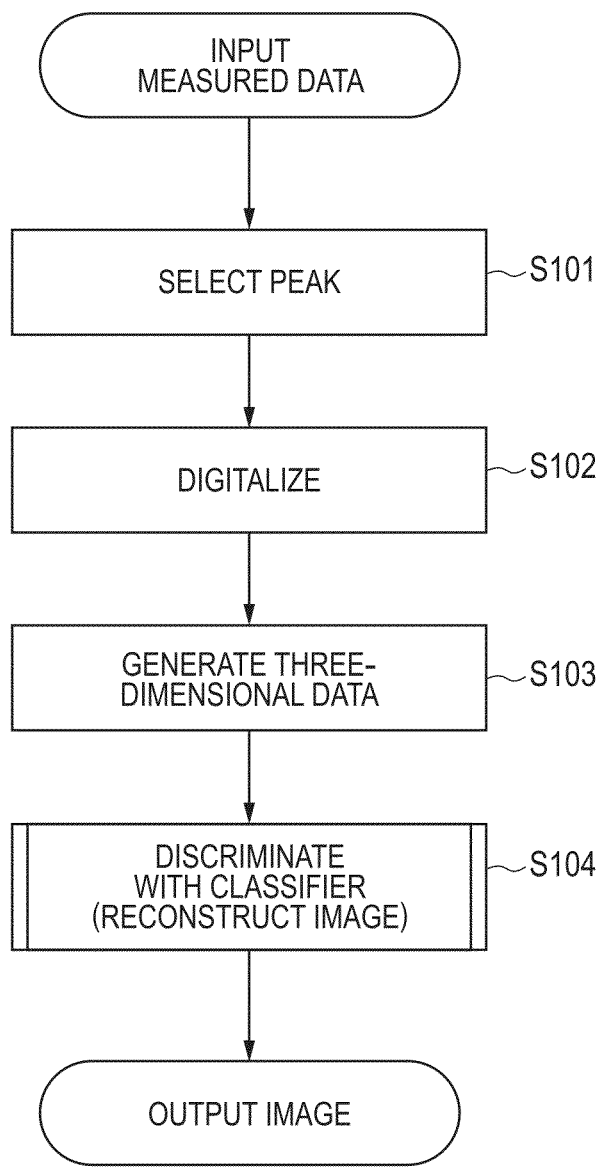
FIG. 4 is a flowchart of the present invention.

FIG. 4 illustrates a flowchart of image reconstruction in the present invention. The following description is made with reference to the drawing according to the order in the flowchart.

Figure 3A:
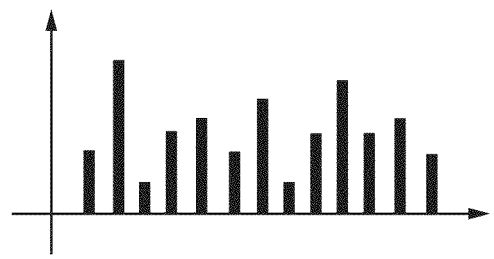
FIGS. 3A, 3B, and 3C are conceptual diagrams of peak components in spectra.
Figure 3B:
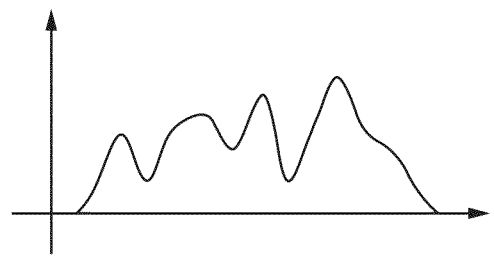
Figure 3C:
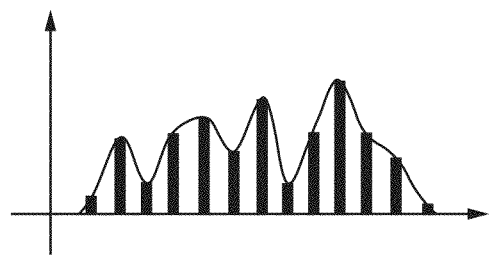

In Step S101 of FIG. 4, a peak to be used for the image reconstruction is selected. As used herein, the peak means, in the case of such measured signals (e.g., a mass spectrum) as illustrated in FIG. 3A, the signal intensity of the signals, or means, in the case of such measured signals (e.g., a Raman spectrum) as illustrated in FIG. 3B, the signal intensity in the case of discretizing the signals, i.e., FIG. 3C. Next, in Step S102, the data is digitalized. In Step S103, multidimensional data including a position of each point (region) where a spectrum has been measured in a space and a measured spectrum at each point in the space (peak component) is generated from the digitalized data.

Figures 2A, 2B, 2C:
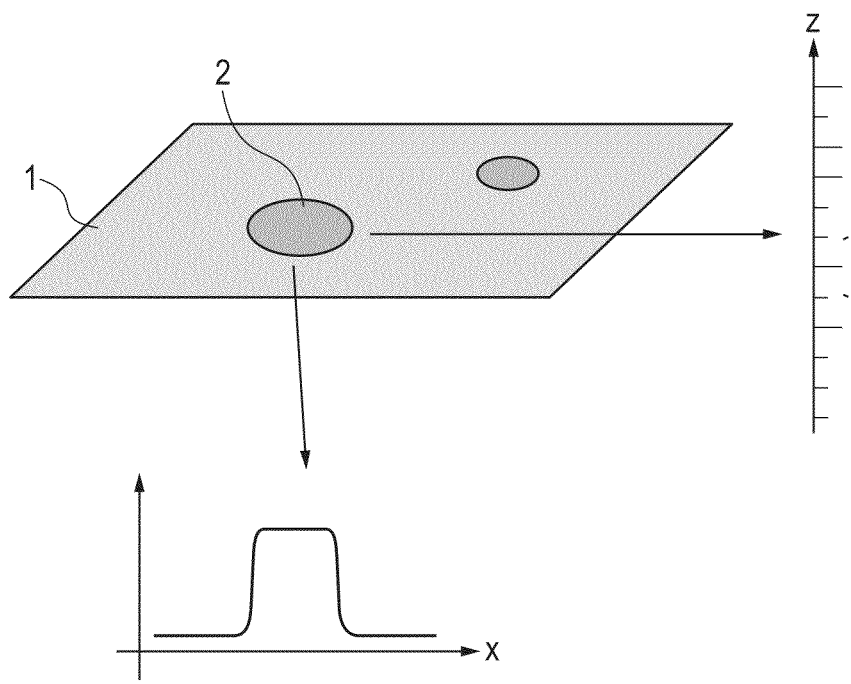
FIGS. 2A, 2B, and 2C are schematic diagrams of spectrum signals having an intensity distribution in a two-dimensional plane.

FIGS. 2A, 2B, and 2C illustrate schematic diagrams of a measured spectrum measured at each point on a space. For example, when a two-dimensional plane is considered as a space in which signals are acquired, information to be obtained is three-dimensional data. When each point in a three-dimensional space in generating the three-dimensional data is expressed by coordinates (X, Y, Z), the components X and Y are coordinates on a two-dimensional space (XY plane), in which measured spectrum signals have been obtained, and correspond to FIG. 2B, and the component Z is a measured spectrum signal at each point on the XY plane, and corresponds to FIG. 2C. Thus, the components X and Y contain the X-coordinate and Y-coordinate of the point where a signal has been measured, respectively, and the component Z contains a value for a measured signal corresponding to the intensity of each peak component.

In Step S104 of FIG. 4, the signals are discriminated with a generated classifier to output an image. For the generation of the classifier, for example, machine learning may be employed. In the machine learning, a judgment criterion for connecting measured data to information on a biological tissue is generated from already acquired data (the data is referred to as training data).

Figure 5:
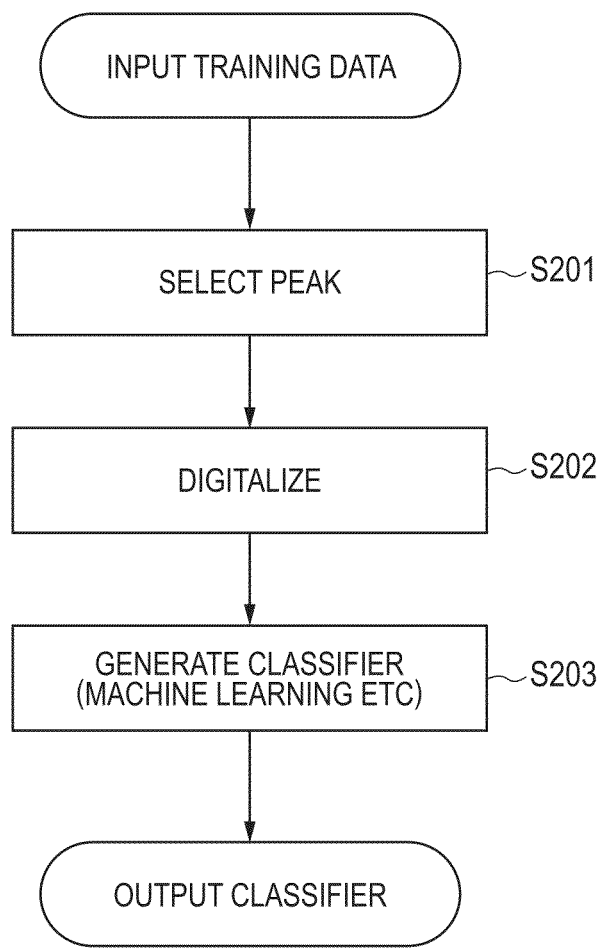
FIG. 5 is a flowchart of machine learning.

FIG. 5 illustrates a flowchart for generating an classifier. The following description is made with reference to the drawing according to the order in the flowchart.

In Step S201 of FIG. 5, a peak to be used for the image reconstruction is selected. Next, in Step S202, the data is digitalized. In Step S203, an classifier is generated from the digitalized data by, for example, machine learning. There may be employed, as a technique for the machine learning, for example, a Support Vector Machine (SVM), a decision tree, or a random forest method in consideration of an ensemble average thereof. Hereinafter, a case of employing the decision tree is described as an example of supervised machine learning.

Figure 6A:
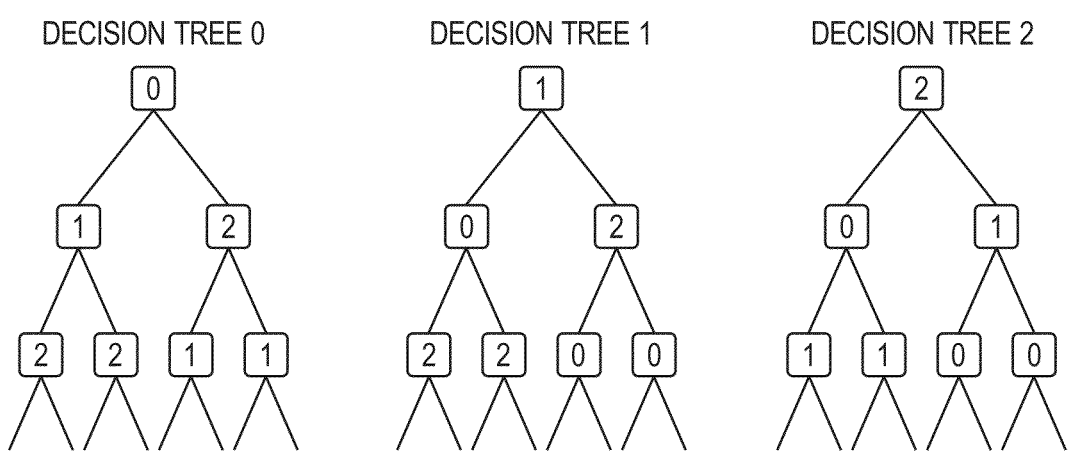
FIGS. 6A and 6B are schematic diagrams in the case of using a decision tree as an classifier.
Figure 6B:
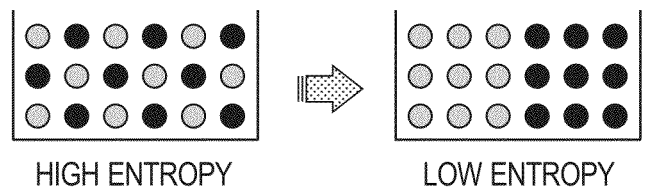

FIGS. 6A and 6B illustrate a process for generating a decision tree to serve as an classifier by a decision tree algorithm. The presence and absence of a certain peak component can be expressed by 1 and 0, respectively, and hence the presence and absence of multiple peak components can be expressed by a decision tree including hierarchical binary trees (in this case, the number of peaks to be used equals the number of hierarchies). As used herein, the binary tree refers to data expressed in a branched structure. Respective spectra to be learned are accompanied by identification numbers (labels) for biological tissues, such as 1 for a cancer tissue and 0 for a normal tissue, as training data. In the case of expressing spectrum data by the decision tree, which peak component is first expressed is an important issue (FIG. 6A). In this case, however, its purpose is efficient classification into the same label. Hence, entropy is recursively evaluated, and such a decision tree that can reduce entropy most efficiently is finally determined and used as an classifier (FIG. 6B). In this connection, the entropy is defined by Expression (1), and a decrease in the entropy corresponds to the classification of a set of mixed data accompanied by different labels into a set of data accompanied by the same label. In Expression (1), i means a node number of a branch portion of a decision tree, and p means a partition probability (at each node, percentages of respective labels).

$$-\sum_{i=0}^{n} \{p(0\mid i)\log p(0\mid i) + p(1\mid i)\log p(1\mid i)\} \quad \text{Expression (1)}$$

Figure 7C:
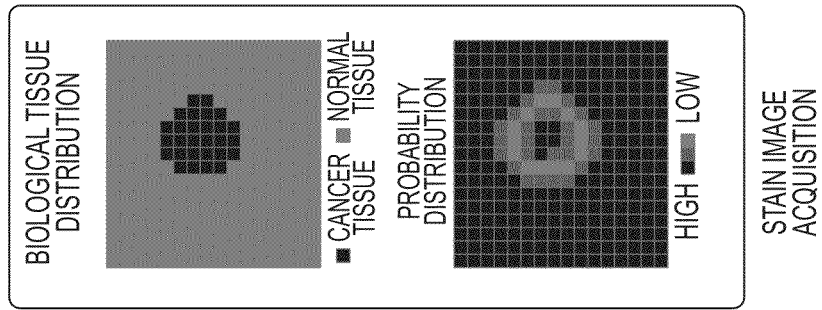
FIGS. 7A, 7B, and 7C are diagrams schematically illustrating a series of processes of the present invention.
Figure 7B:
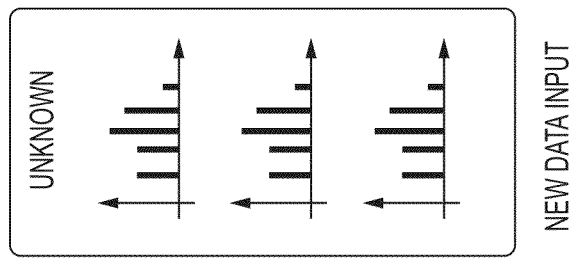
Figure 7A:
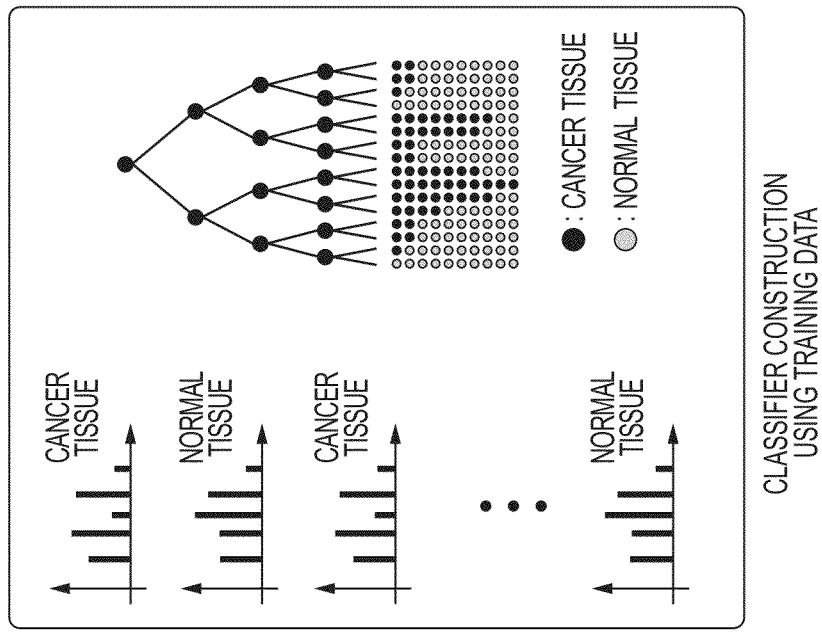

FIGS. 7A, 7B, and 7C schematically illustrate the series of processes illustrated in the flowcharts of FIGS. 4 and 5.

In FIG. 7A, an classifier is generated by machine learning, and in FIG. 7B, newly measured data is input. Then, in FIG. 7C, as a reconstruction image, for example, a probability distribution of a biological tissue distribution (resulting from the machine learning) is acquired.

It should be noted that data to be utilized in the machine learning and classification is not limited to spectrum data at each point in a space, and for example, distribution information on each spectrum component (morphological information) may also be utilized.

Figure 8:
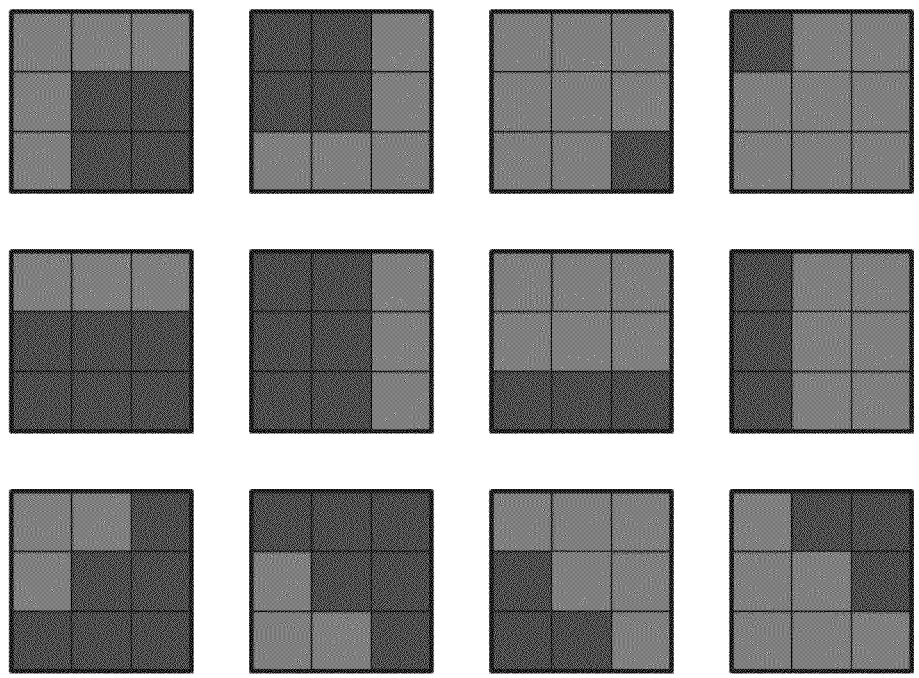
FIG. 8 is a schematic diagram of formation patterns of morphological data.
Figure 9:
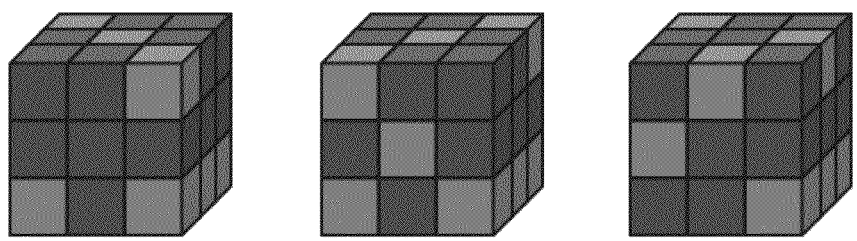
FIG. 9 is a schematic diagram of three-dimensional information.
Figure 10A:
FIGS. 10A and 10B are diagrams schematically illustrating the effectiveness of use of three-dimensional information.
Figure 10B:
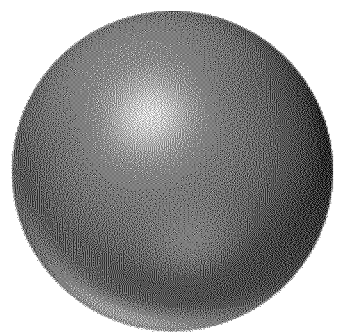

In this case, for example, as illustrated in FIG. 8, a peripheral area of a pixel of interest is cut out, and attention is paid to patterns formed by the region. For example, when a two-dimensional plane is considered as a space in which signals are acquired, data to be utilized in the machine learning and classification is data having a three-dimensional structure based on a total of in-plane distribution information and spectrum information (FIG. 9: hereinafter, the data is referred to as multidimensional information). FIGS. 10A and 10B schematically illustrate the advantage of a case of using multidimensional information as compared to a case of using, for example, two-dimensional information including only morphological information. For example, when data having a columnar structure (FIG. 10A) and data having a spherical structure (FIG. 10B) are present, both are a circle in terms of two-dimensional information and thus cannot be identified. However, when attention is paid to multidimensional information, both can be identified more clearly because a column and a sphere are clearly different in structure from each other.

Procedures for the machine learning and classification in the case of using multidimensional information are essentially the same as those in the case of using spectrum data described above. In this case, however, data itself is not used for a vector to be used for the classification (hereinafter, the vector is referred to as feature vector), and multiple feature values appropriate for describing its patterns may be acquired and used as feature vectors for the machine learning and classification processing. Typical examples of the feature values include a volume, a curvature, a spatial gradient, and a higher-order local autocorrelation (HLAC).

Further, a method involving using multidimensional information hierarchically may be employed. In this case, for example, as illustrated in FIG. 11, respective classifiers (the classifiers are referred to as first classifiers) are generated from distribution information on respective spectrum components. Then, reconstruction values corresponding to the distributions of the respective spectrum components are acquired from the distributions of the respective spectrum components. Then, again, an classifier (the classifier is referred to as second classifier) is generated from a series of the acquired values (the values are referred to as second spectrum), and a final reconstruction image is acquired through use of the classifier. The utilization of such hierarchical multidimensional information enables image reconstruction utilizing both of a resolution in a spectrum direction and distribution information on a spectrum component.

The present invention can be realized by an apparatus that implements the above-mentioned specific embodiment. FIG. 1 illustrates the configuration of the entire apparatus according to the present invention. A sample on a substrate is represented by reference numeral 1, and a signal detector is represented by reference numeral 2. Further, a signal processor for subjecting acquired signals to the above-mentioned processing is represented by reference numeral 3, and an image display for displaying the results of the signal processing on a screen is represented by reference numeral 4.

EXAMPLE 1

Hereinafter, Example 1 of the present invention is described. In this example, through use of a TOF-SIMS 5 type apparatus (trade name) manufactured by ION-TOF GmbH, a tissue section containing an HER2 protein at an expression level of 2+ and subjected to trypsin digestion treatment (manufactured by Pantomics, Inc.) was measured by SIMS under the following conditions.
Primary ion: 25 kV $Bi^+$, 0.6 pA (pulse current value), macro-raster scan mode
Primary ion pulse frequency: 5 kHz (200 μs/shot)
Primary ion pulse width: about 0.8 ns
Primary ion beam diameter: about 0.8 μm
Measurement range: 4 mm×4 mm
Number of pixels used for measuring secondary ion: 256× 256
Cumulative time: 512 shots per pixel, single scan (about 150 minutes)
Secondary ion detection mode: positive ion The resultant SIMS data contains XY coordinate information representing a position and a mass spectrum per shot for each measured pixel. For example, for each measured pixel, the SIMS data contains, as spectrum data, a peak (m/z=720.35) corresponding to a mass number in which one sodium atom adsorbs to one of the digestion fragments of the HER2 protein, and information on a peak component attributed to each biological tissue.

Figure 12A:
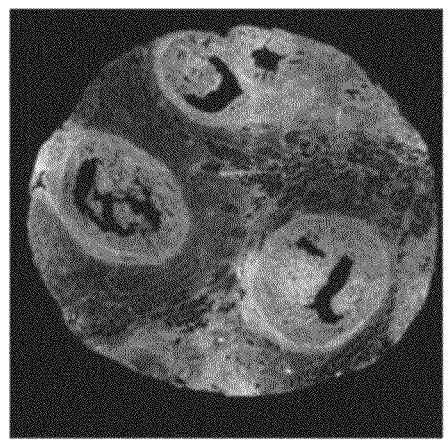
FIGS. 12A and 12B are images showing application results of the present invention.

FIG. 12A shows the result obtained by subjecting the tissue section containing an HER2 protein at an expression level of 2+ (manufactured by Pantomics, Inc.) to immunostaining for the HER2 protein, and observing the tissue section with a light microscope. In FIG. 12A, a portion at which the HER2 protein is expressed at a higher level is displayed brighter. Further, the sample subjected to the SIMS measurement and the sample subjected to the immunostaining are not the same but are adjacent sections excised from the same lesion tissue (paraffin block).

Figure 12B:

FIG. 12B shows the result of image reconstruction through the application of the technique of the present invention to the above-mentioned data. The image data of FIG. 12A is used for the label decision of training data in machine learning, and 4,096 pieces of data are used as the training data. Further, the number of the peaks used is six in total, and m/z values corresponding to the peaks are 692.35, 720.35, 932.63, 1,101.5, 1,128.6, and 1,326.4, respectively, three of which correspond to theoretical values for the digestion fragments. In this image, a white portion indicates a portion identified as a cancer tissue, and a black portion indicates a portion identified as a normal tissue.

Figure 13:
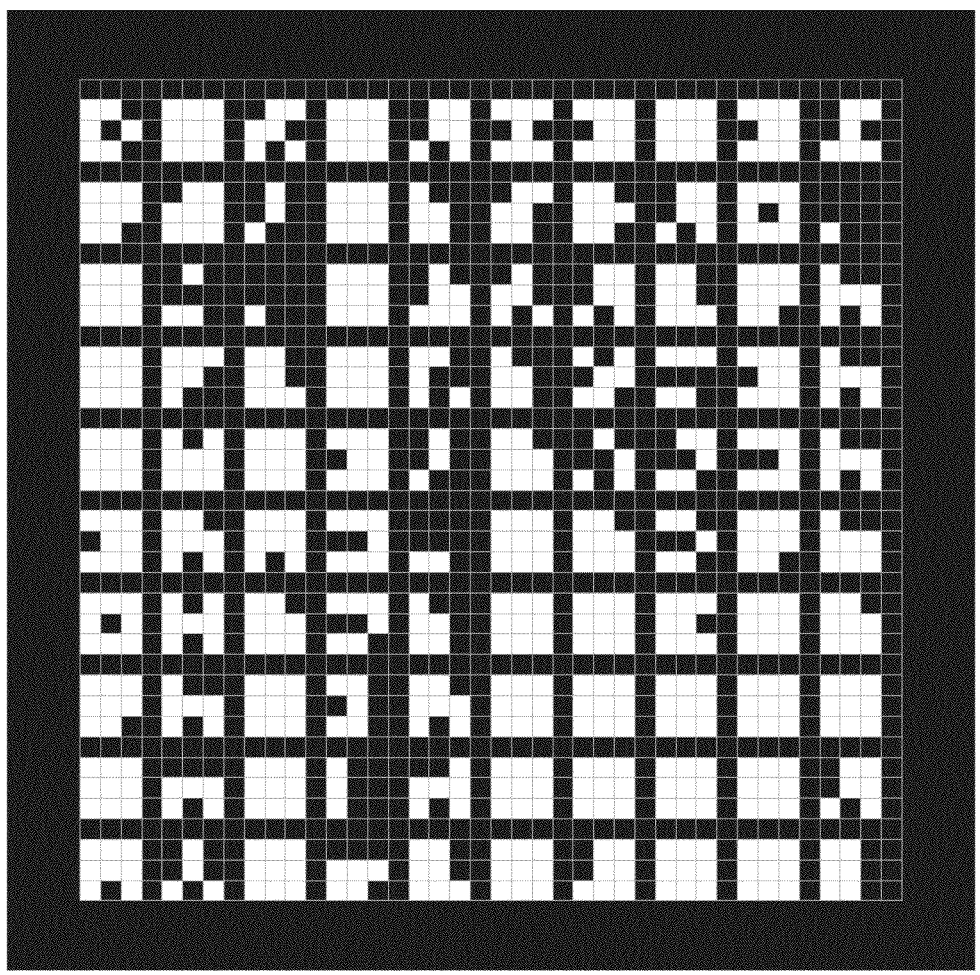
FIG. 13 is a diagram illustrating training data generated from a spectrum distribution (morphological information).

FIG. 13 illustrates a total of 100 pieces of training data for machine learning, generated in the case of using distribution information (morphological information) on a peak (m/z=1,128.6) component. A 3×3 block including an attention point at the center is utilized as the morphological information.

FIG. 14 shows the result of image reconstruction using the distribution information (morphological information) on the peak (m/z=1,128.6) component. The image data of FIG. 12A described above is used for the label decision of training data in machine learning, and 4,096 pieces of data are used as the training data.

FIG. 15A shows a partially enlarged image of the result of image reconstruction using only peak information, and FIG. 15B shows a partially enlarged image of the result of image reconstruction using peak information and its distribution information (morphological information). The results reveal that a salt-and-pepper pixel component is reduced more by the image reconstruction using morphological information as well. As described above, according to the present invention, the distribution of a biological tissue image can be acquired through use of not only the above-mentioned spectrum data but also its spatial distribution information.

EXAMPLE 2

Hereinafter, Example 2 of the present invention is described. Although the apparatus conditions and experiment conditions of this example are the same as those in the case of Example 1, image reconstruction was performed by utilizing spectrum three-dimensional information hierarchically.

FIG. 16 illustrates a total of 27 pieces of training data for machine learning, generated in the case of using distribution information (multidimensional information) on multiple peak (m/z=720.35, 1,128.6, and 1,326.4) components. A 3×3×3 block including an attention point at the center is utilized as the multidimensional information.

FIGS. 17A, 17B, and 17C show the results of image reconstruction through the generation of first classifiers from the distribution information on the respective spectrum components. FIGS. 17A, 17B, and 17C correspond to cases of using the spectrum components (m/z=720.35, 1,128.6, and 1,326.4), respectively. In each case, 4,096 pieces of data are used as training data.

FIG. 18 shows the result in the case of generating a second classifier from the results acquired through use of the first classifiers and reconstructing a final image based on the second classifier.

FIG. 19A shows a partially enlarged image of the result of image reconstruction using only distribution information on a single spectrum component, and FIG. 19B shows a partially enlarged image of the result of image reconstruction utilizing hierarchical classifiers using distribution information on multiple spectrum components. The results reveal that a salt-and-pepper pixel component is reduced more by the image reconstruction using distribution information on multiple spectrum components. As described above, according to the present invention, it is also possible to acquire the distribution of a biological tissue image by generating hierarchical classifiers through use of distribution information on multiple spectrum components and utilizing the hierarchical classifiers.

The present invention can be utilized as a tool for effectively supporting pathological diagnosis.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-016428, filed Jan. 30, 2012, and Japanese Patent Application No. 2013-001864, filed Jan. 9, 2013, which are hereby incorporated by reference herein in their entirety.

What is claimed is:

1. A method of reconstructing an image of a sample through use of multiple measured spectra obtained by measuring respective regions of the sample, the method comprising acquiring an image through utilization of an intensity distribution in the regions of at least one peak in each of the measured spectra and a classifier,
wherein the acquiring of the image through the utilization of the intensity distribution in the regions of the at least one peak and the classifier comprises acquiring the image through utilization of the classifier hierarchically for distribution information on each peak.

2. The method of reconstructing an image according to claim 1, wherein the classifier is generated through utilization of training data.

3. The method of reconstructing an image according to claim 1, wherein the measured spectra comprise one of mass spectra and Raman spectra.

4. An apparatus for acquiring an image, the apparatus being configured to reconstruct the image through use of the method according to claim 1 and comprising a computer for acquiring the image through utilization of the intensity distribution and the classifier.

5. An image display comprising a display means for clearly displaying a diseased site in pathological diagnosis through utilization of the apparatus for acquiring an image according to claim 4.

6. A pathological diagnosis method comprising utilizing the method of acquiring an image according to claim 1.

7. The method of reconstructing an image according to claim 1, wherein the respective regions of the sample are two-dimensional regions and the acquired image is two-dimensional image information.

8. The method of reconstructing an image according to claim 1, wherein the respective regions of the sample are three-dimensional regions and the acquired image is three-dimensional image information.

* * * * *